(12) United States Patent  
Finkelstein et al.

(10) Patent No.: US 8,959,218 B2  
(45) Date of Patent: Feb. 17, 2015

(54) SECURE DYNAMIC QUALITY OF SERVICE USING PACKETCABLE MULTIMEDIA

(75) Inventors: Jeff Finkelstein, Alpharetta, GA (US); John J. Coppola, Cumming, GA (US); Nicolas Emil Greenfield, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 350 days.

(21) Appl. No.: 12/820,068

(22) Filed: Jun. 21, 2010

(65) Prior Publication Data

US 2011/0314086 A1   Dec. 22, 2011

(51) Int. Cl.
*G06F 15/173* (2006.01)
*H04L 29/06* (2006.01)
*H04N 21/24* (2011.01)
*H04N 21/61* (2011.01)

(52) U.S. Cl.
CPC ........... *H04L 65/80* (2013.01); *H04N 21/2402* (2013.01); *H04N 21/6118* (2013.01); *H04N 21/6175* (2013.01); *H04L 65/103* (2013.01)
USPC ............ 709/226; 709/227; 709/228; 709/203

(58) Field of Classification Search
USPC ................. 709/227–228, 203; 370/230; 726/1
See application file for complete search history.

(56) References Cited

U.S. PATENT DOCUMENTS

| | | | | |
|---|---|---|---|---|
| 6,047,322 | A * | 4/2000 | Vaid et al. | 709/224 |
| 6,970,426 | B1 * | 11/2005 | Haddock | 370/235.1 |
| 7,116,682 | B1 * | 10/2006 | Waclawsky et al. | 370/468 |
| 7,599,296 | B2 * | 10/2009 | Tartarelli et al. | 370/235.1 |
| 7,627,675 | B2 * | 12/2009 | Bernstein et al. | 709/225 |
| 7,774,498 | B1 * | 8/2010 | Kraemer et al. | 709/240 |
| 7,843,832 | B2 * | 11/2010 | Choi et al. | 370/235.1 |
| 8,483,194 | B1 * | 7/2013 | Wu et al. | 370/338 |
| 2003/0086413 | A1 * | 5/2003 | Tartarelli et al. | 370/352 |
| 2007/0143858 | A1 * | 6/2007 | Hearty | 726/27 |
| 2007/0147422 | A1 * | 6/2007 | Urano et al. | 370/468 |
| 2008/0084887 | A1 * | 4/2008 | Proctor et al. | 370/395.21 |
| 2008/0137657 | A1 * | 6/2008 | Wood | 370/392 |
| 2010/0316064 | A1 * | 12/2010 | Riley et al. | 370/463 |
| 2010/0322074 | A1 * | 12/2010 | Nakahira | 370/235 |
| 2011/0040951 | A1 * | 2/2011 | Akirav et al. | 712/4 |
| 2011/0131627 | A1 * | 6/2011 | Abendroth et al. | 726/1 |
| 2011/0320631 | A1 * | 12/2011 | Finkelstein | 709/232 |

* cited by examiner

*Primary Examiner* — Abdullahi Salad  
(74) *Attorney, Agent, or Firm* — Merchant & Gould P.C.

(57) ABSTRACT

A secure mechanism for third party hosted services to communicate with networks to allow dynamic quality of service to be provisioned for content of the third parties is disclosed. By authenticating the third party hosted services, the service provider is able to enter into business arrangements to share revenue with the third party content providers based on the premium service. A subscriber issues a request to a third party server. In response to issuing the request to the third party server, a dynamic quality of service request is received from the third party server. The dynamic quality of service request is validated and a session is provisioned between the client and the third party server implementing the requested dynamic quality of service.

22 Claims, 13 Drawing Sheets

SECURE DYNAMIC QUALITY OF SERVICE USING PACKETCABLE MULTIMEDIA

FIELD OF THE INVENTION

This disclosure relates in general to enabling subscribers to access third party content, and more particularly to providing secure dynamic quality of service using packetcable multimedia.

BACKGROUND

On the Internet, many paths may exist between a given pair of nodes. The total message-carrying capacity (bandwidth) between two given nodes is the maximum amount of data per unit time that can be transmitted from one node to the other. Using a technique called packet switching, this data can be transmitted along several paths at the same time.

Service providers may provide their subscribers with various services including multimedia services by which subscribers obtain television and other multimedia content for viewing, data services such as Internet access, and telephony services including local, long distance, and/or video conferencing telephone services. In a bundled scenario, a provider may deliver two or more of these services to subscribers over an access network physical layer that is common to the bundled services.

However, applications and services continue to be developed to drive consumers demand for increases in Internet bandwidth. For example, the escalating popularity of social networking sites and the emergence of high-bandwidth applications, such as voice and video, act to increase consumer demand. Video downloads and transmissions are the most bandwidth intensive, wherein a video download may consume 8 to 10 times the bandwidth required for voice or music.

Further, products are increasingly becoming available to allow consumers to link their broadband audio, video, and data downloads to electronic devices and gadgets throughout their home. In a networked home, cable modems, digital video recorders (DVR), voice over IP (VoIP) systems, personal computers, and TVs are all linked. As each of the latest digital entertainment services come on line, the need for bandwidth further increases.

To fully take advantage of the new capabilities, consumers must upgrade to higher tiered services and packages. However, most customers have difficulty in concretely identifying rates of data throughput. Further, the demand for higher bandwidth is transitory. Often the need for higher bandwidth is related to a particular download.

The networks of communications systems providers are controlled internally.

As a result, services are maintained and distributed internal to the operator's network.

Accordingly, third parties cannot provide premium services to subscribers of the network with a high quality of service. The service provider is limited to obtaining content from such providers and maintaining this content internally. This arrangement prevents network operators from entering into business arrangements to share revenue with the third party content providers.

Accordingly, there is a need for a secure mechanism for third party hosted services to communicate with networks to allow dynamic quality of service to be provisioned for content of the third parties.

SUMMARY OF THE INVENTION

To overcome the limitations described above, and to overcome other limitations that will become apparent upon reading and understanding the present specification, embodiments for providing for a secure mechanism for third party hosted services to communicate with networks to allow dynamic quality of service to be provisioned for content of the third parties is disclosed.

The above-described problems are solved by using standard protocols to provide a dynamic quality of service (DQoS) to facilitate the third party's premium services to subscribers of the service provider. By authenticating the third party hosted services, the service provider is able to enter into business arrangements to share revenue with the third party content providers based on the premium service.

An embodiment includes a method for securely provisioning Dynamic Quality of Service (DQOS) with an external third party. The method includes issuing, for a subscriber, a request to a third party server, in response to issuing the request to the third party server, receiving a dynamic quality of service request from the third party server, validating the dynamic quality of service request and provisioning a session between the client and the third party server implementing the requested dynamic quality of service.

In another embodiment, a system for securely provisioning Dynamic Quality of Service (DQOS) with an external third party is disclosed. The system includes a cable modem termination system configured to route a request for content to third party server, an edge proxy server configured to receive a dynamic quality of service request from the third party server in response to issuance of the request to the third party server by the cable modem termination system and to validate the dynamic quality of service request and a policy manager for communicating with the cable modem termination system to provision a session with the third party server implementing the requested dynamic quality of service.

A computer readable medium including executable instructions which, when executed by a processor, provides secure provisioning of Dynamic Quality of Service (DQOS) with an external third party, is disclosed. The computer readable medium includes instructions executable by the processor to issue, for a subscriber, a request to a third party server, in response to issuing the request to the third party server, receive a dynamic quality of service request from the third party server, validate the dynamic quality of service request and provision a session between the client and the third party server implementing the requested dynamic quality of service.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to providing a secure mechanism for third party hosted services to communicate with networks to allow dynamic quality of service to be provisioned for content of the third parties. Standard protocols are used to provide a dynamic quality of service (DQoS) to facilitate the third party's premium services to subscribers of the service provider. By authenticating the third party hosted services, the service provider is able to enter into business arrangements to share revenue with the third party content providers based on the premium service.

Figure 1:
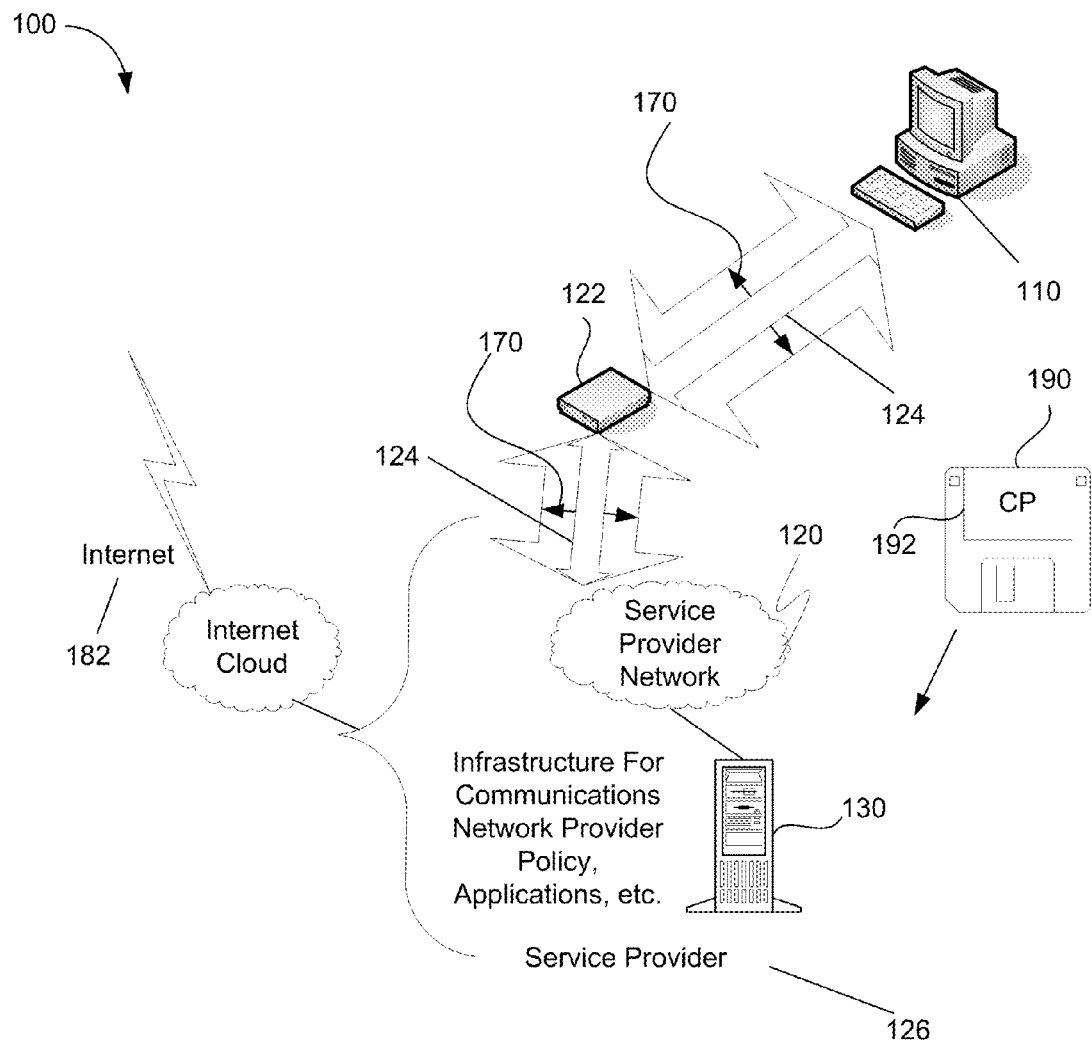
FIG. 1 is a block diagram of a system providing increased bandwidth according to an embodiment of the invention.

FIG. 1 is a block diagram of a system 100 providing in-network online storage with increased session bandwidth according to an embodiment of the invention. In FIG. 1, a subscriber 110 is coupled to a communications network provider 120, such as a cable operator, through an interface device 122, such as a router or cable modem. Most operations performed by the user are performed employing a first predetermined bandwidth 124. For example, the first predetermined bandwidth 124 may be used for browsing the Internet, VoIP calls, content download and other typical online activity. Policy servers 130 may be used to control the amount of bandwidth that is allocated to the subscriber by the communications network provider 120.

The communications network provider 120 provides and maintains their own network for providing content and/or data to subscribers 110. The communications network provider 120 may provide cable programming, movies-on-demand and other services/content over the network. The communications network provider 120 may also provide the subscriber 110 access to the Internet via the network. When a subscriber needs an increase in bandwidth, a boost 170 in bandwidth may be provided by the communications network provider 120.

Embodiments may be implemented in a suitable computing environment. Embodiments may also be implemented in combination with other types of computer systems and program modules. Generally, program modules include routines, programs, components, data structures, and other types of structures that perform particular tasks or implement particular abstract data types. By way of example, computer readable media 190 can include computer storage media and communication media. Computer storage media 190 includes volatile and nonvolatile, removable and non-removable media implemented in any method or technology for storage of information 192, such as computer readable instructions, data structures, program modules or other data. Computer storage media 190 typically embodies computer readable instructions, data structures, program modules or, in some instances, other data in a modulated data signal such as a carrier wave or other transport mechanism. The term "modulated data signal" means a signal that has one or more of its characteristics set or changed in such a manner as to encode information in the signal. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located at the communications network provider 120.

Embodiments implemented on computer-readable media 190 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 190 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a processing device.

As mentioned briefly above, a number of program modules and data files may be stored and arranged for controlling the operation of processing devices. Thus, processing devices, such as infrastructure 130 of the communications network provider 120 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Figure 2:
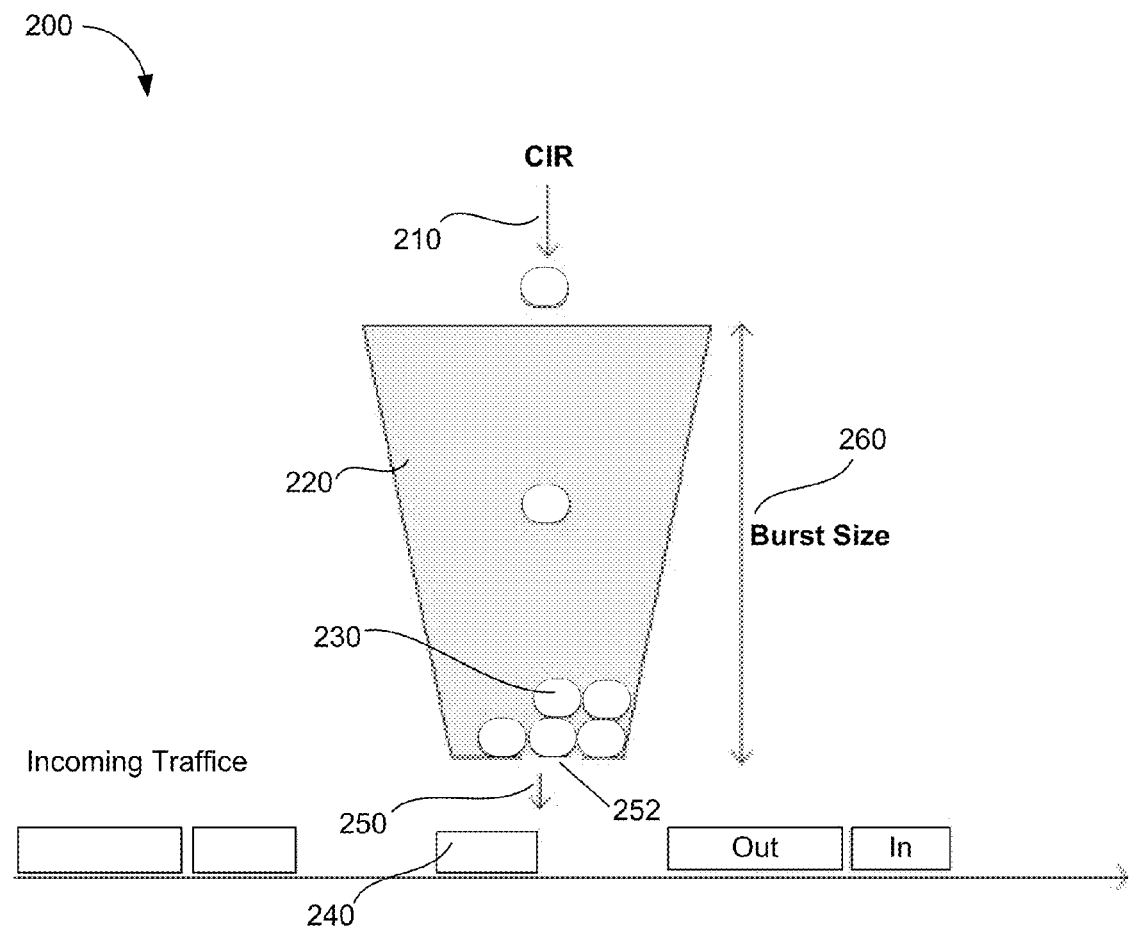
FIG. 2 shows the token bucket algorithm according to one embodiment of the invention.

FIG. 2 shows the token bucket algorithm 200 according to one embodiment of the invention. The token bucket algorithm 200 is used to control the amount of data that is injected into a network. A token bucket provides a mechanism by which bursty traffic can be shaped to present a steady stream of traffic to the network, as opposed to traffic with erratic bursts of low-volume and high-volume flows. With a single token bucket 220 per user, the token accumulation rate is often called Committed Information Rate (CIR) 210, to distinguish it from combined meters that have multiple buckets and token sources. The token bucket 220 contains tokens 230, each of which can represent a unit of bytes or a single packet of predetermined size.

Traffic can be transmitted, based on the presence of tokens in the bucket, which is merely an abstract container that holds aggregate network traffic to be transmitted. A token bucket algorithm relies upon a token accumulation rate and a burst tolerance. Thus, tokens 230 represent equivalents of traffic volume since traffic is transmitted based on the presence of tokens in the bucket.

The token bucket 220 stores tokens which are added to the bucket 220 at a constant pace until the bucket 220 has reached its burst size 260, meaning the bucket 220 is full. Tokens 230 are removed 250 when traffic 240 arrives. Packets that arrive to the meter at a moment when there are sufficient tokens in the bucket 220 corresponding to its size are declared 'Conforming' or 'In Profile'. Thus, when tokens are present, a flow is allowed to transmit traffic up to its peak burst rate if there are adequate tokens in the bucket 220 and if the burst threshold is configured appropriately.

To provide a different rate cap, the rate of token removal 250 is increased. This can be visualized as increasing an aperture hole 252 in the bottom of the token bucket 220. If the token bucket 220 has a bigger hole 252, and the bucket 220 has been prefilled, bits of data are going to be transmitted as quickly as tokens can fall through the hole 252, e.g., at line rate.

The token bucket 220 may be manipulated by dynamically enlarging the bucket 220 and/or dynamically making the hole 252 in the bottom of the bucket 220 larger. The level of service may therefore be set by simply making a change to the configuration file of a subscriber. Packet cable multimedia (PCMM) allows an external source to be used to manipulate the bucket 220, i.e., to make the change to the configuration file for the subscriber. So the size of the bucket 220 may be dynamically modified when there is available bandwidth.

When there is not sufficient bandwidth, the size of the bucket 220 may be reduced dynamically. The dynamic adjustment to allow a temporary speed increase may be initiated in response to a request for more bandwidth from a subscriber. This can be automatic, customer triggered, or the service provider may trigger the change on behalf of the subscriber. In addition, a third party, if authenticated, may be allowed to make the dynamic adjustment. Packet cable multimedia, allows the service provider to exert more control on how much bandwidth is used.

The dynamic adjustment to provide the speed boost allows customers to achieve speeds greater than their rate cap, although it does not require changes to existing hardware or software reducing the need for new equipment to achieve higher speeds. The speed boost dramatically changes the customers speed without rebooting the modem. The boost is created by overriding the rate cap as assigned to the customer by preloading the customer's token bucket 220 to capacity, thereby allowing them to burst for a short time at line rate. When the token bucket 220 is exhausted the customer continues at their provisioned rate cap.

Those skilled in the art will recognize that more than one token bucket may be implemented. In addition, token buckets 220 may be implemented on a per service flow basis. In a single token bucket case, the token bucket 220 is used to control the initial burst related to an individual flow. With multiple token buckets 220, the primary token bucket controls the total burst size, but secondary token buckets 220 may be used to control the individual burst sizes. For example, if a primary token bucket 220 is sized to 1 MB and secondary token buckets 220 are sized to 512 KB, each burst can be no more than 512 KB for 2 bursts, with a subsequent bursts being at line rate. Accordingly, the use of secondary token buckets 220 controls the individual burst rate up until the primary token bucket 220 is depleted.

Figure 3:
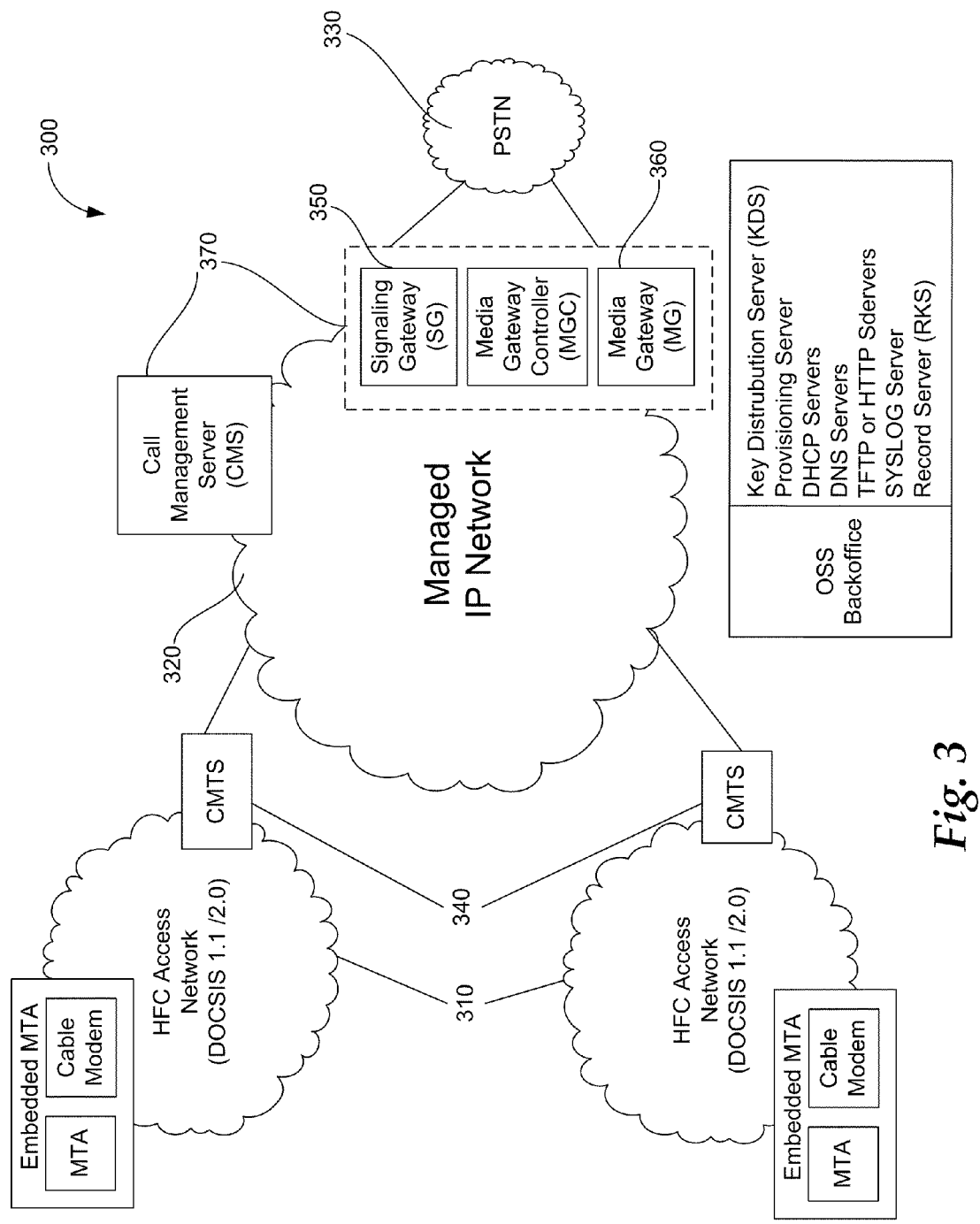
FIG. 3 is a block diagram of Packet Cable MultiMedia (PCMM) according to one embodiment.

FIG. 3 is a block diagram 300 of PacketCable MultiMedia (PCMM) according to one embodiment. The basic functions are provided on several general-purpose servers 370, which lead to a low-cost, highly flexible, scalable, distributed architecture. At a very high level, the PCMM architecture 300 may be associated with three networks: the DOCSIS® HFC Access Network 310, the Managed IP Network 320, and the PSTN 330. Thus, a server 370 according to PCMM enables the delivery of residential voice telephony over IP, commonly referred to as digital voice. The end-to-end architecture 300 shows a complete system that includes device provisioning, call signaling, event messaging (accounting), configuration management, QoS, PSTN interconnection, and security. These functions enable telecommunications companies to control provisioning of services to customers.

According to an embodiment, PCCM is used to provide speed increases that are greater than the rate cap of the customer. By overriding the rate cap assigned to the customer by preloading the customer's token bucket to capacity, the customer may experience a burst for a short time at line rate. When the token bucket is exhausted the customer returns to the provisioned rate cap. The Cable Modem Termination System (CMTS) 340 provides communication between the DOCSIS® HFC Access Network 310 and the Managed IP Network 320. Both the Signaling Gateway (SG) 350 and the Media Gateway (MG) 360 provide connectivity between the Managed IP Network 320 and the PSTN 330.

Figure 4:
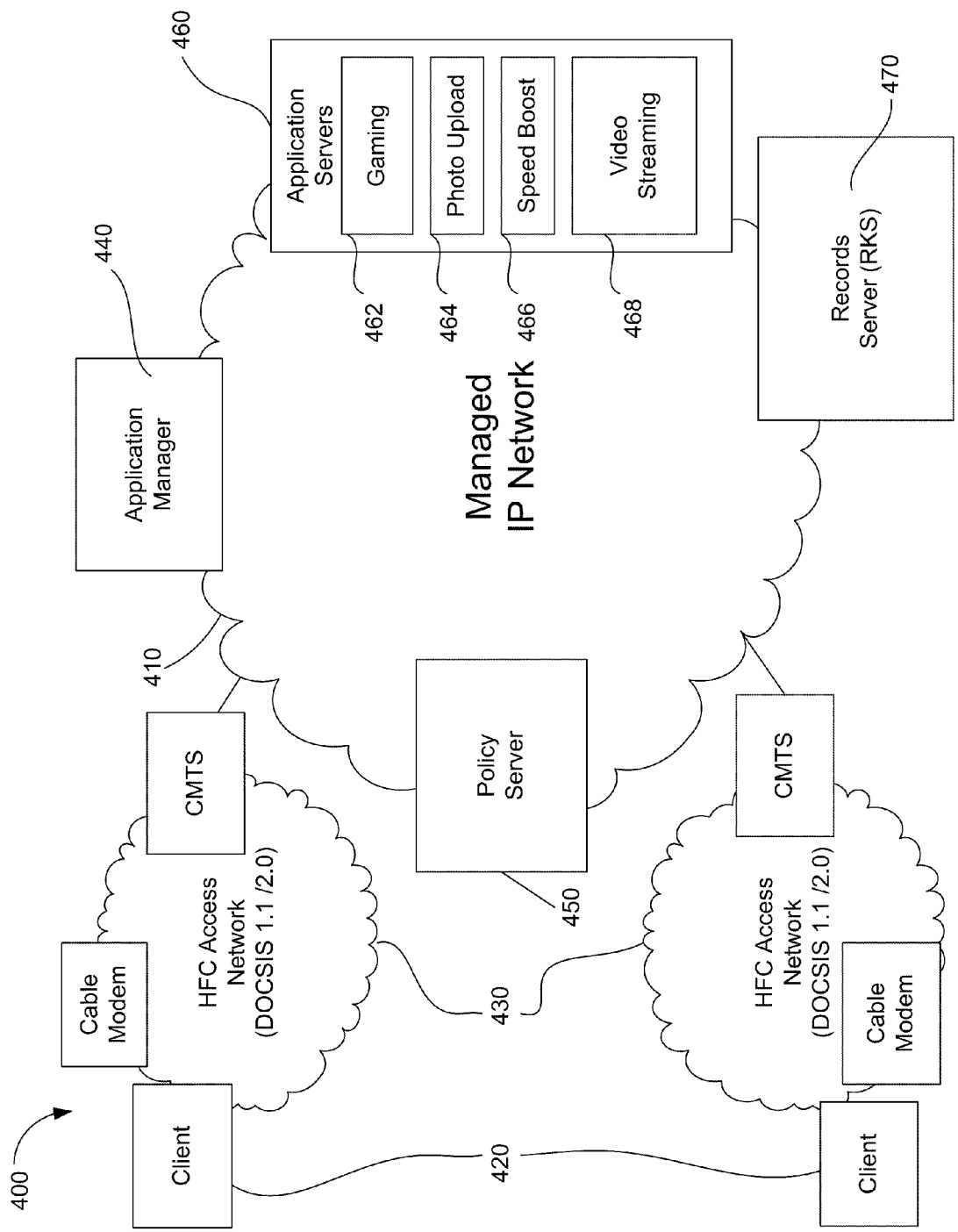
FIG. 4 is a block diagram showing PacketCable™ Multimedia network elements according to one embodiment.

FIG. 4 is a block diagram 400 showing PacketCable™ Multimedia network elements according to one embodiment. The PacketCable™ Multimedia specification defines an IP-based platform 410 for delivering QoS-enhanced multimedia services to the customer 420 over DOCSIS® access networks 430. The managed IP network 410 provides QoS authorization and admission control, event messages for billing and other back-office functions, and security to support a wide range of IP-based services beyond telephony. While the PacketCable™ architecture 400 may be configured to include provisioning of residential telephony services as shown in FIG. 3, the PacketCable™ Multimedia architecture 400 offers a general-purpose platform for cable operators to deliver a variety of IP-based multimedia services that require QoS management and control. The Application Manager 440 and Policy Server 450 authenticate subscribers and ensure that subscribers receive the required Quality of Service needed for any specific multimedia applications. Application Servers 460 host content and provide application services to Client devices 420.

Many applications require a large amount of bandwidth. For example, power gaming 462 via application servers 460 is one application that would benefit from a speed increase. Online gaming users expect a superior experience; thus, effectively managing latency and jitter for their gaming sessions is important. Once a subscriber is logged in to the service provider system via clients 420, the subscriber would be able to go to a specific gaming page or channel. From that page the subscriber would be able to select a specific game. Each game may be implemented with its own PCMM policy to ensure that the QoS policy only applies to that session and cannot be used for non-authorized applications.

Another example involves photo uploading applications 464. One of the problems with existing photo sharing sites is that it can take a very long time to upload anything more than just a few photos at a time. However, a better customer experience may be provided by using a higher upstream cap in order to quickly upload many photos at once. This particular scenario may require that subscriber at client 420 download a small application that communicates with the speed increase application manager 466. Subscriber logging in with primary account holder status may be provisioned with this PCMM upgrade. However, a configurable check may be implemented so that the service could be opened to non-primary users if so desired. Again, the service provider may control such access dynamically through PCMM 400.

For a subscriber to enjoy video streaming, video streaming application 468 may also utilize a temporary speed increase according to an embodiment of the invention. Video streaming application 468 may provide streaming content, such as HD quality movies, and because of the increasing size of such files an increase in bandwidth may be triggered to download a movie for viewing. Video streaming application 468 may implement a prioritized PCMM service flow that could even allow flawless delivery of HD content. The subscriber may be able to click on a link to view a movie trailer or other streaming content, the required authorization checks are performed and the required service flows are provisioned in the background. The streaming video content authorization checks may include only allowing customers logging in with a primary account holder status to be eligible for the PCMM upgrade, the customer must be associated with an account that also has access to the desired video content, and check the geographical location associated with the account to determine if constraints are applicable, e.g., a pay-per-view or premium sporting event broadcast.

The Record Keeping Server 470 is responsible for accepting event messages, incorporating partial billing information into a single coherent record that describes the resources used during the service, and passing this information on to the billing system.

Figure 5:
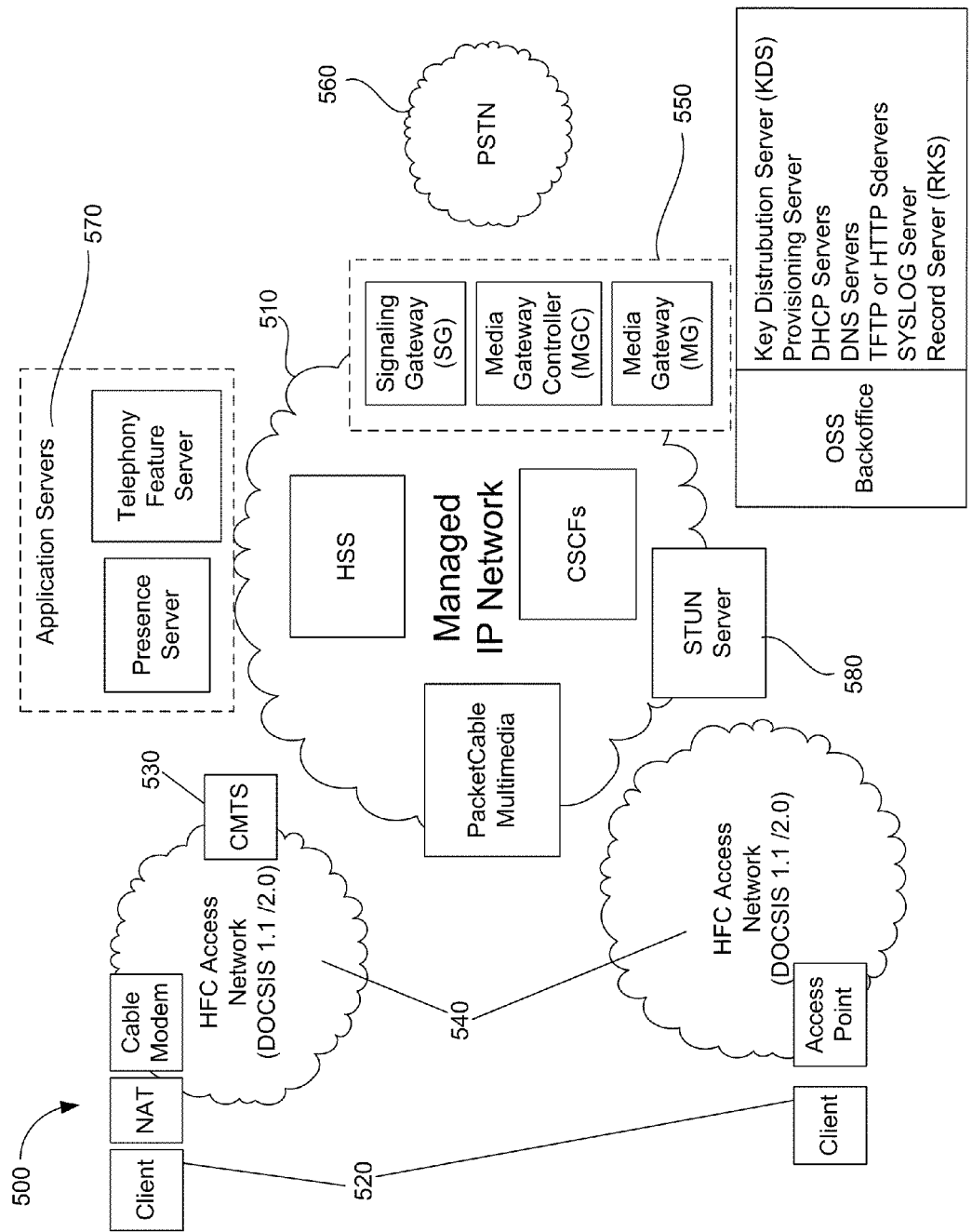
FIG. 5 is a block diagram illustrating another Packet-Cable™ architecture according to an embodiment of the invention.

FIG. 5 is a block diagram 500 illustrating another Packet-Cable™ architecture according to an embodiment of the invention. The architecture 500 in FIG. 5 is configured to extend cable's existing Internet Protocol service environment to accelerate the convergence of voice, video, data, and mobility technologies. The architecture 500 is an application-agnostic architecture that is based on a common network core 510. The network core 510 is a set of network elements that use standard protocols to register clients 520 in the network and to establish sessions. The Cable Modem Termination System (CMTS) 530 provides communication between the DOCSIS® HFC Access Network 540 and the Managed IP Network 510. Both the Signaling Gateway (SG) and the Media Gateway (MG) 550 provide communication between the Managed IP Network 510 and the PSTN 560. Applications servers 570 reside outside the core network for the delivery of enhanced residential and small/medium business digital voice services (including video telephony), and mobility services which also supports feature integration across service platforms according to an embodiment of the invention. The STUN Server 580 is required only when an SMA Gateway is behind a NAT device and needs to establish media sessions with other media clients that may or may not be behind NAT devices. The STUN server 580 determines one of several possible candidate media addresses using a predetermined protocol. A number of applications may utilize the PacketCable core network, such as residential SIP telephony, cellular integration, business services, and HD voice.

Figure 6:
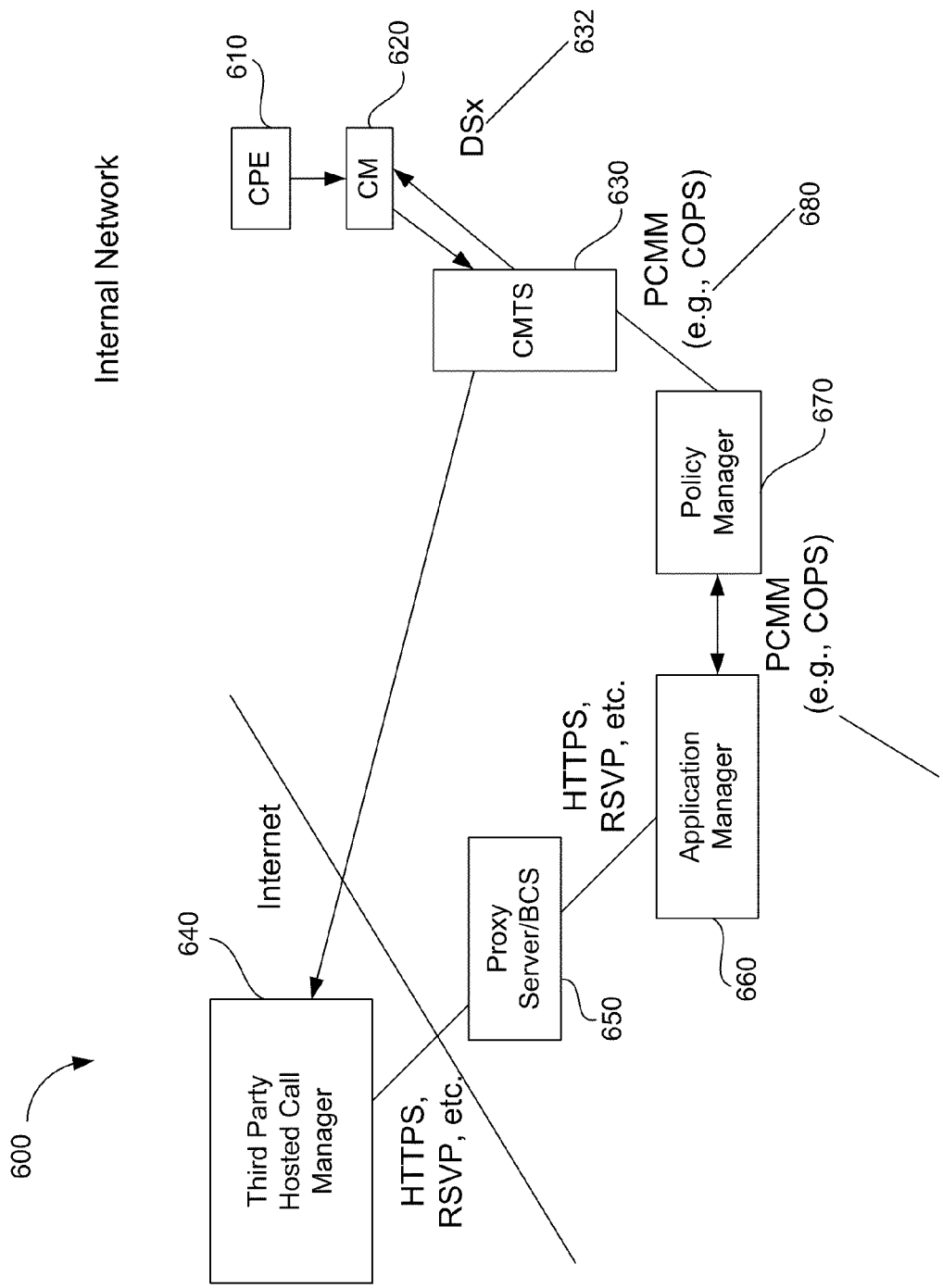
FIG. 6 shows a block diagram of a network that enables signaling for dynamic quality of Service (DQOS) according to one embodiment.

FIG. 6 shows a block diagram 600 of a network that enables signaling for dynamic quality of Service (DQOS) according to one embodiment. With the distribution of services that were traditionally maintained internal to the operators network, a secure mechanism is used for third party hosted services that communicate into the network to allow dynamic quality of service. The network 600 uses standard protocols to provide a dynamic quality of service (DQoS) to facilitate the third party's premium services to subscribers of the service provider. By authenticating the third party hosted services, the service provider is able to enter into business arrangements to share revenue with the third party content providers based on the premium service.

In FIG. 6, the CPE 610 issues a request through the cable modem 620 to a third party server. The CM 620 sends traffic to CMTS 630. The CMTS 630 forwards the customer's request to the Third Party Hosted Call Manager 640. The third party server 640 sends the DQoS request to the Edge Proxy Server 650. Communications from the external network server 640 to an internal network server 650 may be performed using standard public key cryptography. HTTPS may be used for sending the request to the Edge Proxy Server 650. Alternatively, the Resource Reservation Protocol (RSVP) may be used in making a bandwidth request. The Edge Proxy Server 650 validates the request, and then sends the request to the Application Manager 660. HTTPS or RSVP may also be used for this communication.

The Application Manager 660 translates the request to PCMM 680 and sends the translated request to the Policy Manager 670. For example, the request may be transformed to a common open policy service (COPS) over TCP connection within the PCMM 680. COPS enables the management of policy-based admission control decisions and provides a means by which to distribute policies to different network devices. Policy Manager 670 enforces the policies across the network. Policy Manager 670 validates the request and determines the resources needed. Policy Manager 670 then sends a PCMM gate set 672 to CMTS 630. CMTS 630 determines resources availability, creates a PCMM gate and communicates with CM, for example using DSx messaging 632, to set up service flow with enhanced QoS. This may mean, for example, that an increase in bandwidth is provided to the subscriber for accessing the content of the validated third party. After the session is completed, it is closed. The Policy Manager 670 tears-down the communication path and signals the Edge Proxy Server 650 to shut down the connection. The Edge Proxy Server 650 then notifies the Third Party Application Server 640 that the session has completed. The session may be terminated based on receiving a close session notification from the third party, after a predetermined period of time elapses, and/or the number of allowed bytes has been met. The session is torn down and the customer is reset to the standard rate cap.

If the subscriber needs more bandwidth than is currently available, the Policy Manager 670 can move the subscriber to a different flow to provide more capacity to the customer by allowing the subscriber to receive speed boosts as described above with reference to FIGS. 1-2. Thus, dynamically providing QoS, rather than pre-provisioning the quality of service, allows the service provider to offer more types of service.

Accordingly, a service provider verifies the third party and opens up a secure exchange between the validated third party and the subscriber. The service provider only has to provide a signal internal to the network to the packet cable multimedia infrastructure to enable the request.

Figure 7:
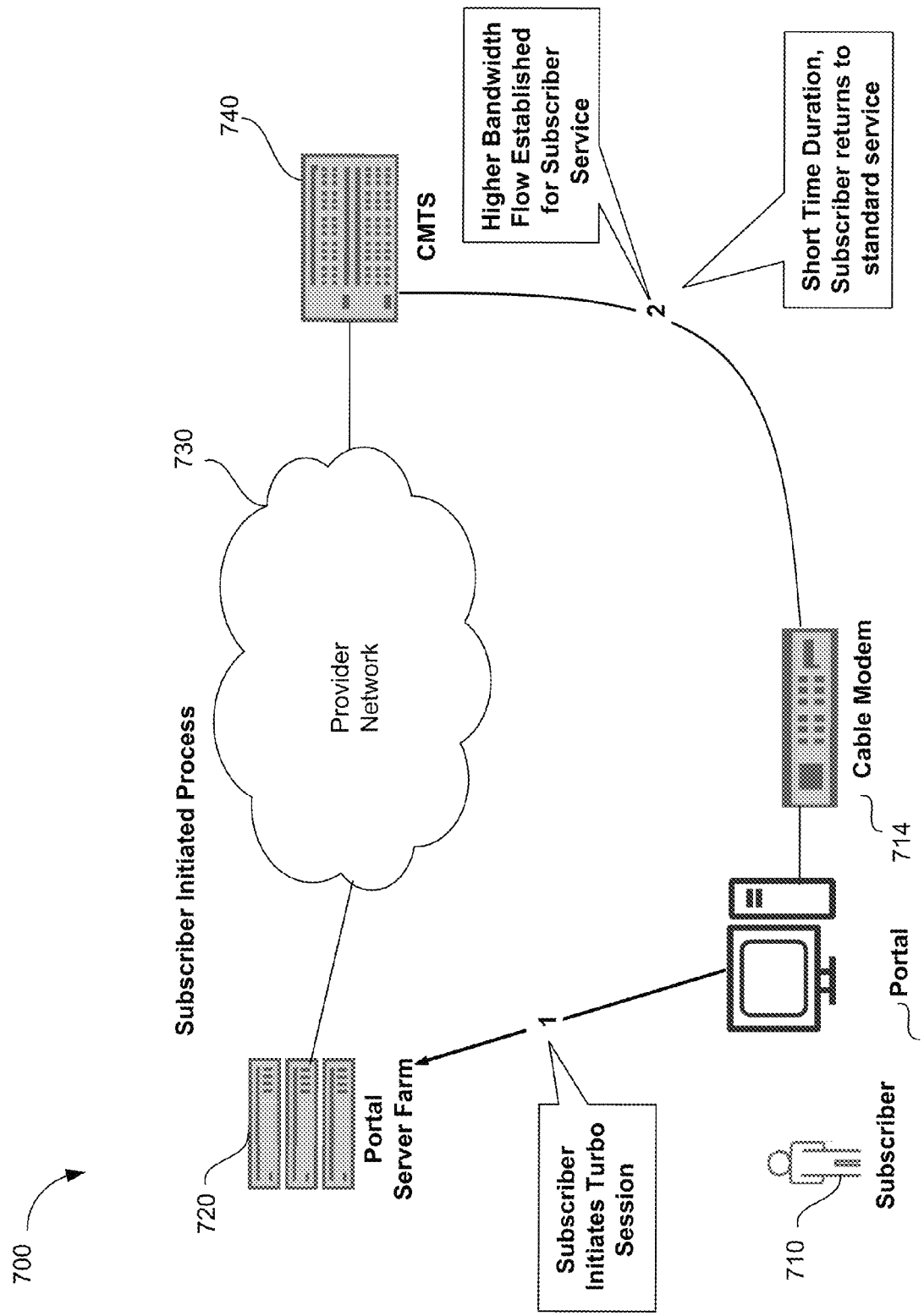
FIG. 7 is illustrates a subscriber initiated bandwidth increase according to an embodiment of the invention.

FIGS. 7-12 show block diagrams illustrating embodiments for increasing the bandwidth for a subscriber. FIG. 7 is illustrates a subscriber initiated bandwidth increase 700 according to an embodiment of the invention. A subscriber may initiate a bandwidth increase, which may be associated with an upstream or a downstream direction. For example, a Turbo Button may be presented to the subscriber to initiate the increase in bandwidth. However, those skilled in the art will recognize that the invention is not meant to be limited to a Turbo Button. Rather, the temporary provisioning of a bandwidth increase may be initiated with a variety of means, e.g., a touch screen on a remote control device, a voice command, entering a code, etc.

In FIG. 7, a subscriber 710 is located at a portal 712. Portal 712 is coupled to a cable modem or other access control device 714. The subscriber 710 initiates an increased bandwidth session, e.g., a turbo session. The command or request for the increased bandwidth is provided to a portal server farm 720, which communicates with CMTS 740 via the provider network 730. The CMTS establishes a higher bandwidth flow for the subscriber. After a short duration, the CMTS may return the subscriber back to the standard service.

Thus, the temporary bandwidth increase may be provided for a short duration, e.g., less than 10-20 minutes. A limit may also be imposed to control the number of times a subscriber can initiate a bandwidth increase within a time period. The subscriber initiated bandwidth increase may also be applied to business accounts. Further, the subscriber initiated bandwidth may be implemented so that it is available to premium subscribers, or all subscribers. In addition, different service tiers may be configured to offer a different number of available activations.

Figure 8:
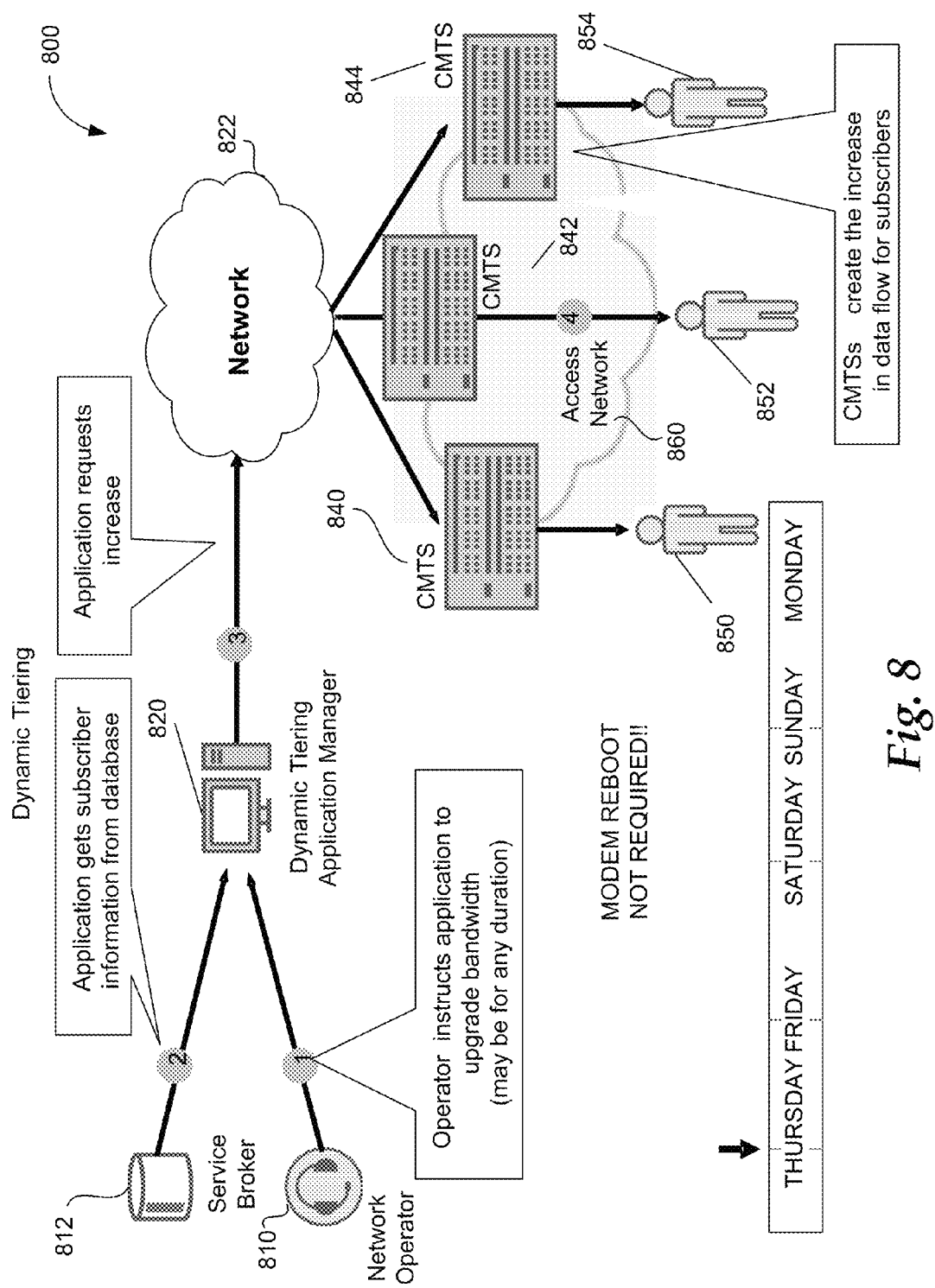
FIG. 8 is illustrates an operator initiated bandwidth increase according to an embodiment of the invention.

FIG. 8 is illustrates an operator initiated bandwidth increase 800 according to an embodiment of the invention. In FIG. 8, a network operator 810 may initiate a bandwidth increase by instructing a dynamic tiering application manager 820 to upgrade the bandwidth. This increase in bandwidth may be set for a predetermined duration by the operator 810. Dynamic tiering application manager 820 obtains subscriber information from database 812. The dynamic tiering application manager 820 communicates with CMTS 840-844 through network 822 to request an increase in bandwidth. CMTS 840-844 are coupled to subscribers 850-854 through access network 860. CMTS 840-844 create the increase in data flow for subscribers 850-854. A modem reboot is not required.

Thus, for an operator initiated bandwidth boost, no subscriber action is required and the increase in bandwidth may be for an upstream or downstream session. Therefore, subscribers may not be actively aware of the increased bandwidth. The operator initiated increase in bandwidth may be offered to all subscribers as an upsell opportunity. The operator may obtain statistics based on which subscribers used the most bandwidth during the promotion of the temporary bandwidth increase. Various means may be used to notify subscribers of the promotion. For example, an e mail notification of the promotion may be sent to subscribers to make them aware of the change.

Figure 9:
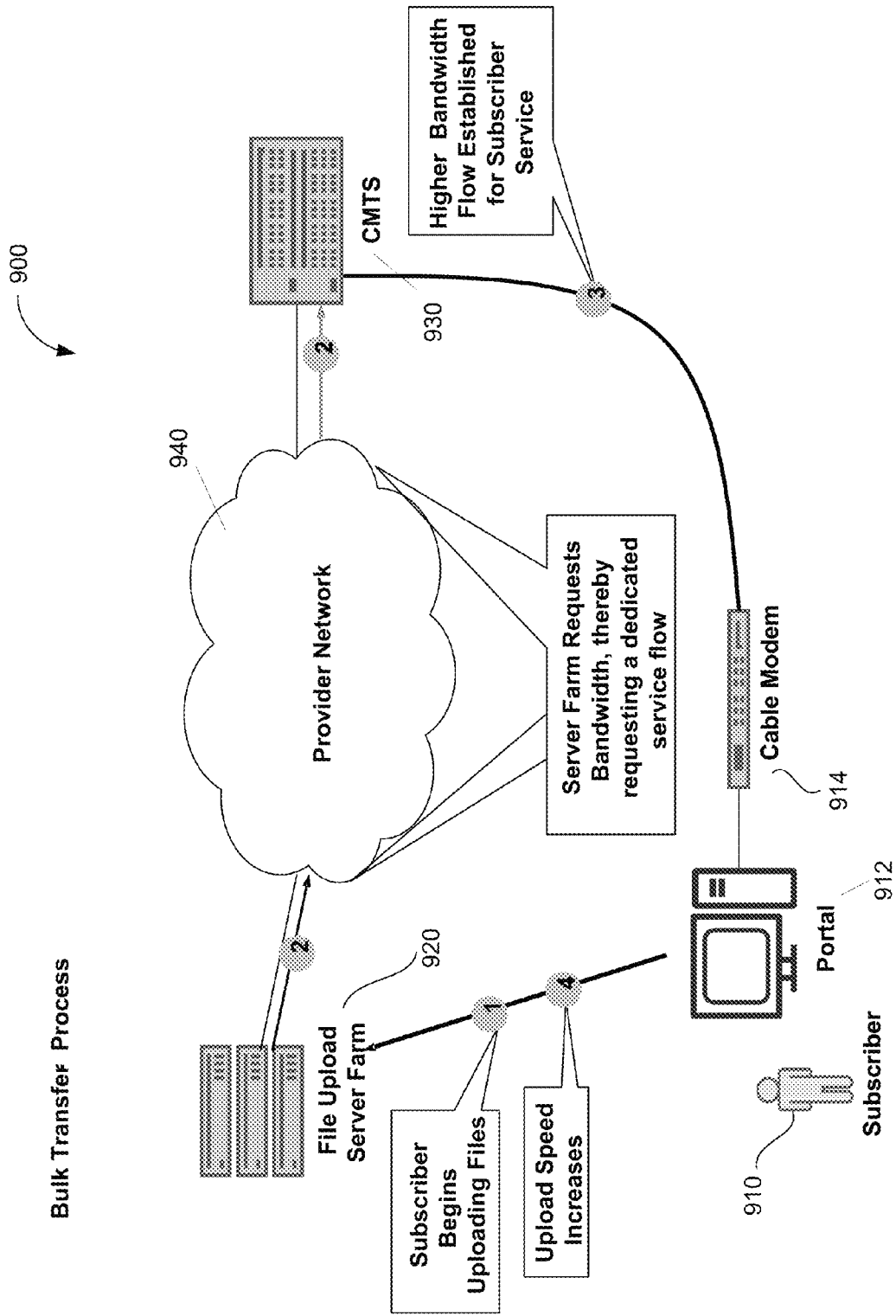
FIG. 9 is illustrates a bulk transfer using a bandwidth increase according to an embodiment of the invention.

FIG. 9 is illustrates a bulk transfer using a bandwidth increase 900 according to an embodiment of the invention. In FIG. 9, a subscriber 910 is at portal 912. Portal 912 is coupled to a cable modem or other access control device 914. The subscriber 910 may begin uploading files to a file upload server farm 920. The server farm 920 communicates with CMTS 930 through provider network 940 to request an increase in bandwidth, e.g., a dedicated service flow. CMTS 930 establishes a higher bandwidth flow for the subscriber 910.

Thus, the subscriber 910 may be provided an increase in bandwidth to upload or download of large files for the purpose of photo storage (i.e., snapfish, ofoto), online backup, web site maintenance, software download, etc. The bandwidth may be dynamically adjusted by the provider. Thus, no subscriber action is required. The increase in bandwidth may be triggered automatically off a specific web page or application.

Figure 10:
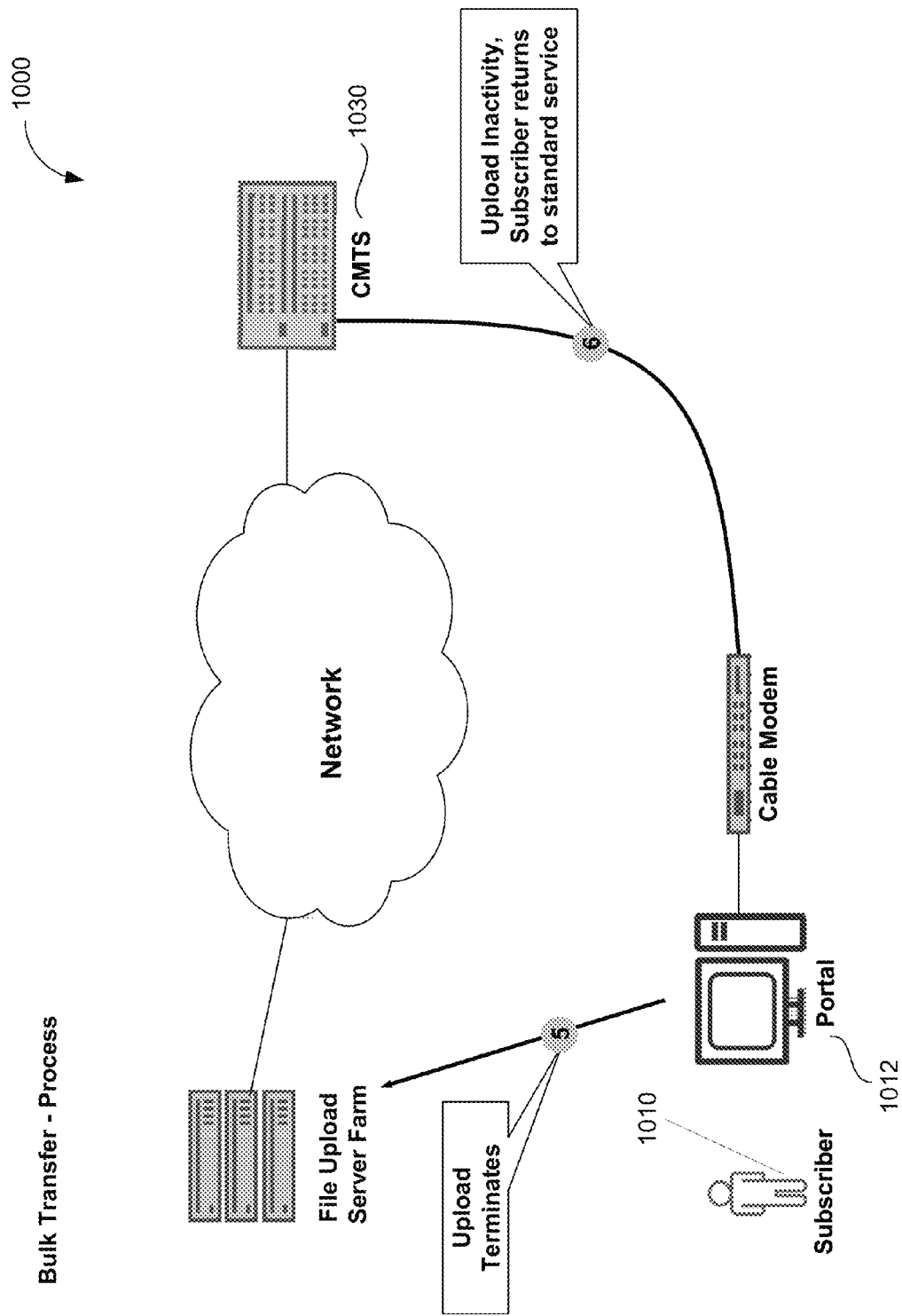
FIG. 10 illustrates termination of the bulk transfer according to an embodiment of the invention.

FIG. 10 illustrates termination of the bulk transfer 1000 according to an embodiment of the invention. In FIG. 10, the upload of files form the portal 1012 of the subscriber 1010 terminates. After a period of inactivity, CMTS 1030 returns the subscriber 1010 to standard service.

Figure 11:
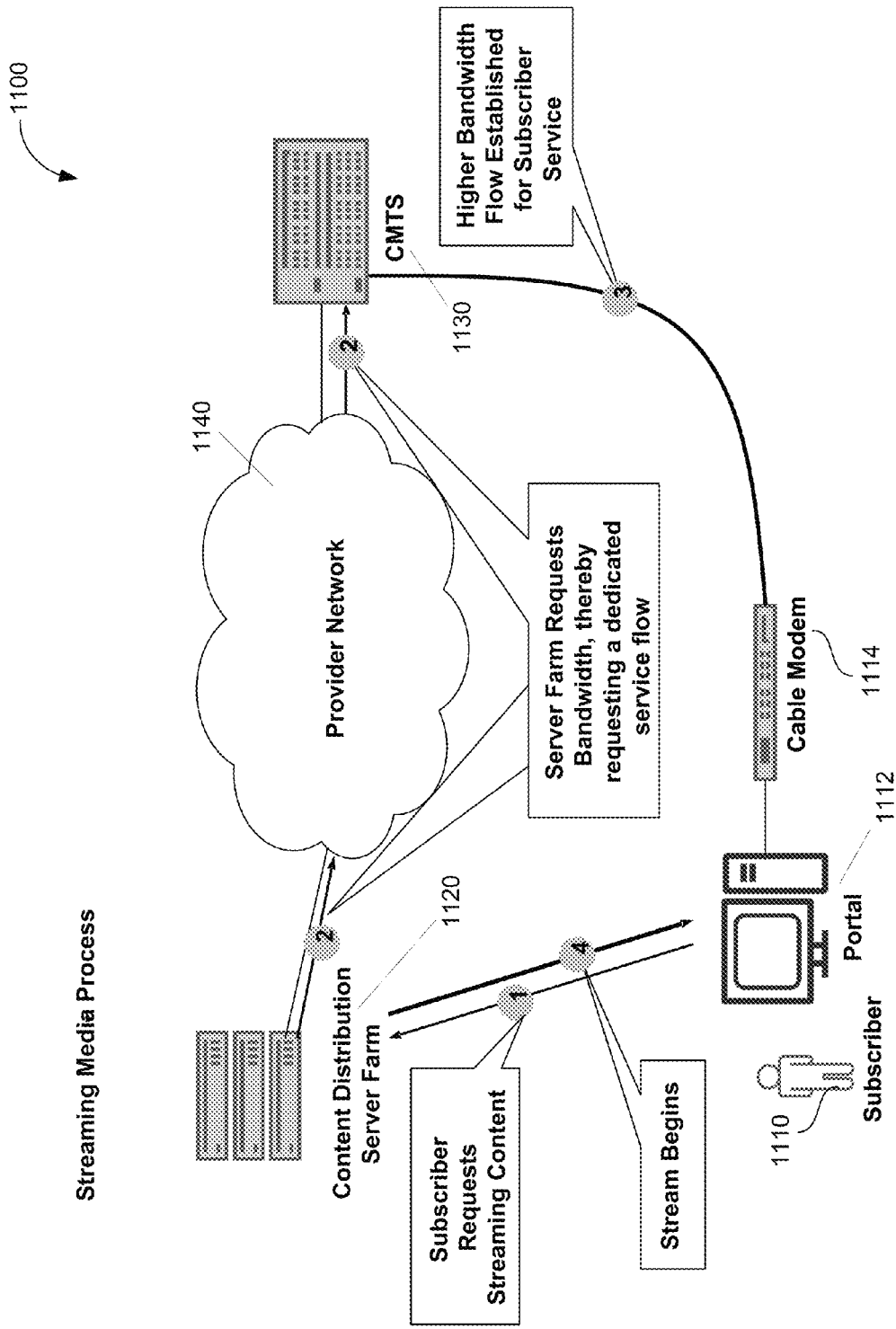
FIG. 11 is illustrates streaming of media using a bandwidth increase according to an embodiment of the invention.

FIG. 11 is illustrates streaming of media using a bandwidth increase 1100 according to an embodiment of the invention. In FIG. 11, a subscriber 1110 is at portal 1112. Portal 1112 is coupled to a cable modem or other access control device 1114. The subscriber 1110 may request streaming content for content distribution server farm 1120. The server farm 1120 communicates with CMTS 1130 through provider network 1140 to request an increase in bandwidth for the streaming of the media content to the subscriber. CMTS 1130 establishes a higher bandwidth flow for the subscriber 1110 and the streaming of the media content to the subscriber 1110 may begin using the increased bandwidth.

Thus, a temporary increase in bandwidth may be used to deliver higher quality audio/video content at guaranteed service levels to subscribers. This service may be offered exclusively to premium subscribers as an added value. For businesses, the capability to dynamically increase bandwidth of a subscriber may result in more traffic from subscribers to a portal. This also allows service providers, such as cable operators, to partner with content providers to enable a premium subscriber experience through the temporary increase in bandwidth.

Figure 12:
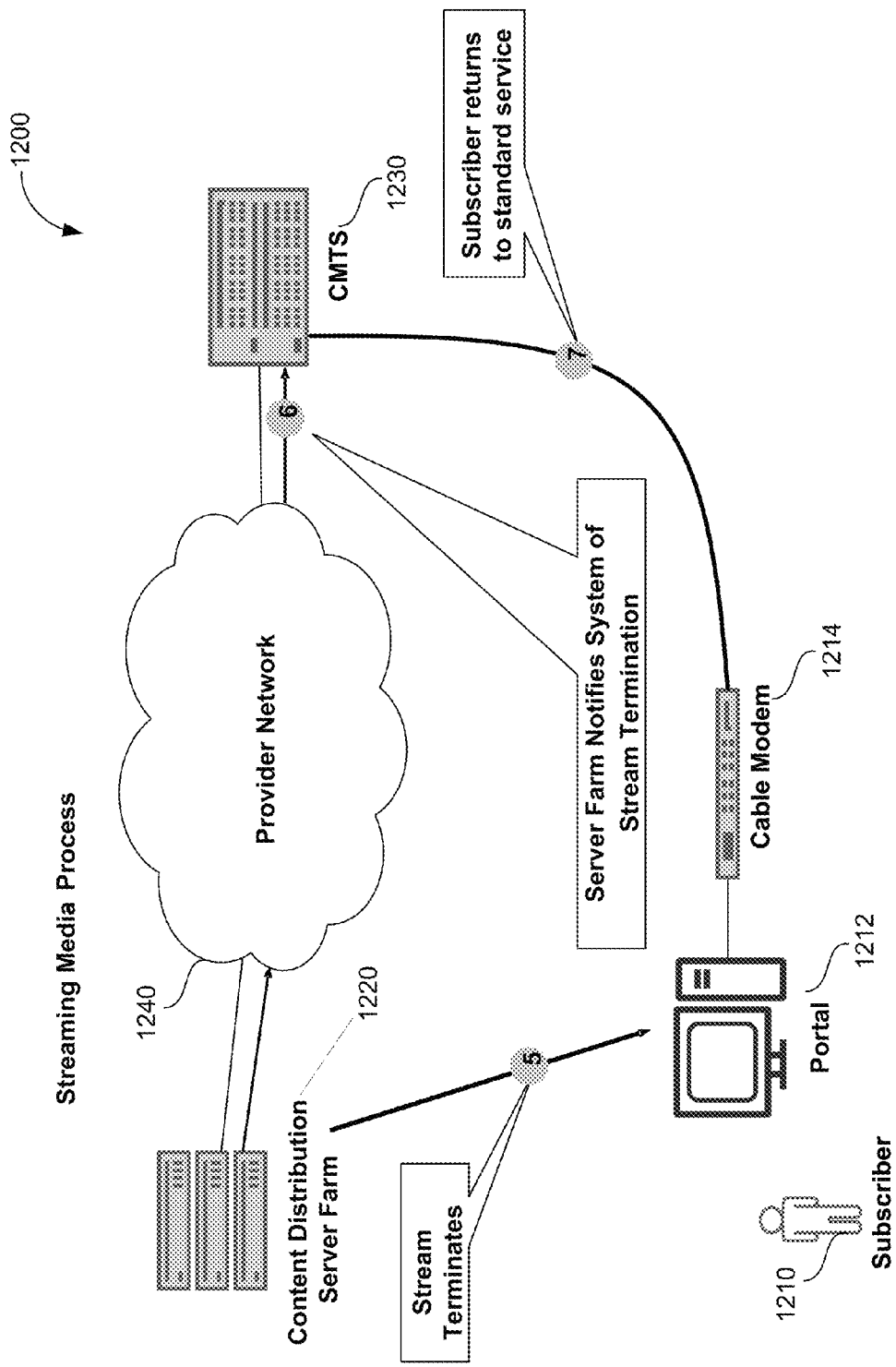
FIG. 12 illustrates termination of the increased bandwidth for the streaming of media content according to an embodiment of the invention.

FIG. 12 illustrates termination of the increased bandwidth for the streaming of media content 1200 according to an embodiment of the invention. In FIG. 12, the stream of the media content to the portal 1212 of the subscriber 1210 terminates. The server farm 1220 communicates to CMTS 1230 through provider network 1240 that the streaming of the media content has completed. CMTS 1230 returns the subscriber 1210 to standard service.

Figure 13:
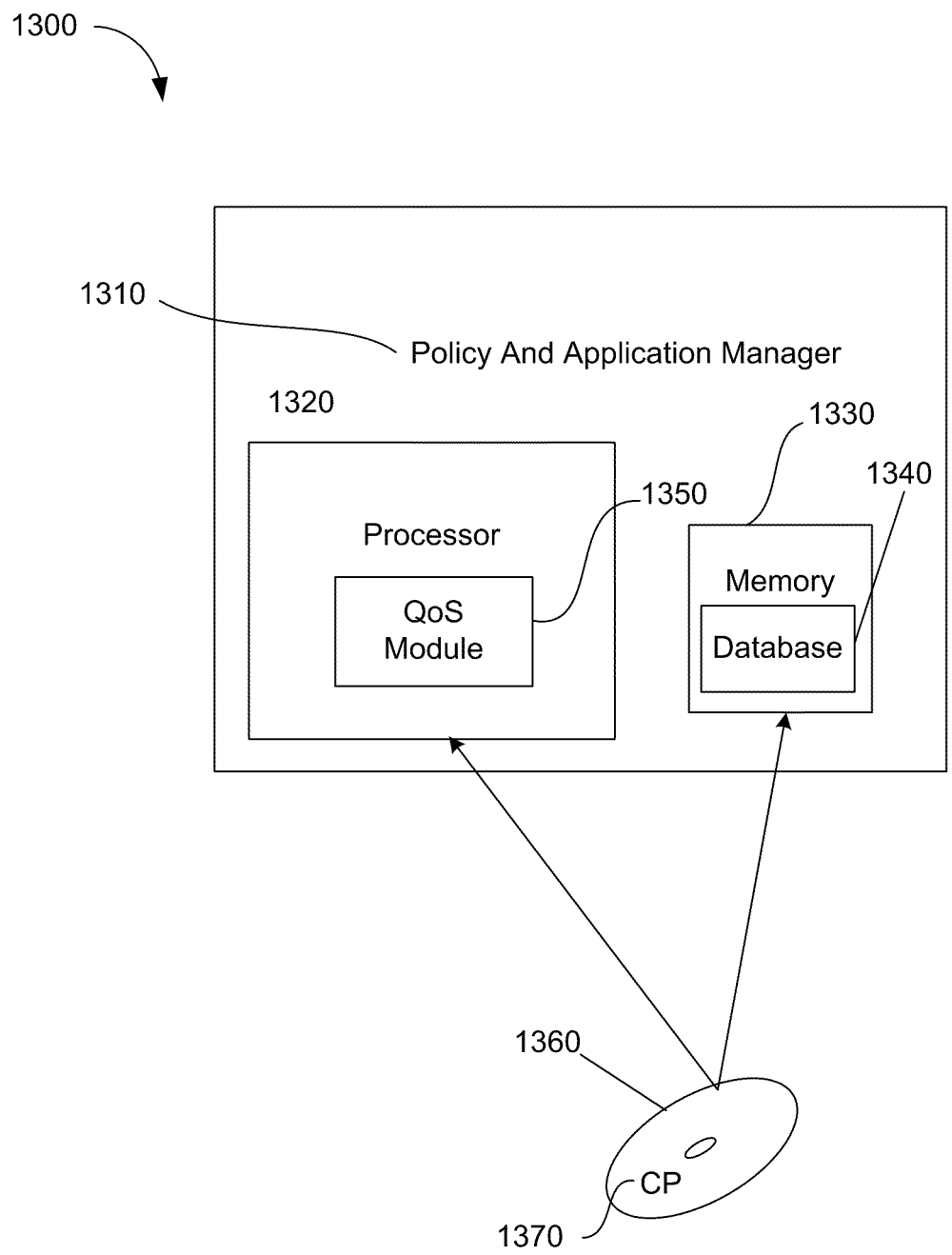
FIG. 13 illustrates a suitable computing environment for implementing a system as described above in FIGS. 1-12 according to one embodiment.

FIG. 13 illustrates a suitable computing environment 1300 for implementing a system as described above in FIGS. 1-12 according to one embodiment. In FIG. 13, a policy and application manager 1310 includes a processor 1320 and memory 1330. Embodiments may also be implemented in combination with other types of computer systems and program modules. Generally, program modules include routines, programs, components, data structures, and other types of structures that perform particular tasks or implement particular abstract data types. By way of example, computer readable media 1360 can include computer storage media or other tangible media. Computer storage media 1360 includes volatile and nonvolatile, removable and non-removable media implemented in any method or technology for storage of information 1370, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 1360 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 1370 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 1320 may be configured to execute instructions that perform the operations of embodiments of the present invention. Memory 1330 thus may store the computer-executable instructions that, when executed by processor 1320, cause the processor 1320 to implement a system as illustrated above in FIGS. 1-12.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for securely provisioning Dynamic Quality of Service (DQOS) with an external third party, comprising:
   issuing, for a subscriber of an internal network, a request to a third party server that is external to the internal network of the subscriber;
   hosting content externally on the third party server of the external third party;
   in response to issuing the request to the third party server, receiving a dynamic quality of service request from the third party server;
   validating the dynamic quality of service request from the third party server at an edge proxy server; and
   in response to receiving and validating the dynamic quality of service request from the third party server:
      determining resources needed to implement the dynamic quality of service request from the third party server;
      determining if the subscriber needs more bandwidth than currently available and moving the subscriber to a different flow to provide more capacity to the subscriber; and
      provisioning a session between a client and the third party server implementing the requested dynamic quality of service wherein the external third party manipulates a customer's token bucket by overriding the rate cap assigned to the customer for receiving content internally over the internal network by pre-loading the customer's token bucket to capacity and dynamically enlarging the token bucket or an aperture hole of the token bucket, thereby allowing the subscriber to experience an increased bandwidth over the internal network while receiving content from the external third party over the internal network.

2. The method of claim 1, wherein the validating the dynamic quality of service request comprises:
   upon validation by the edge proxy server, sending the dynamic quality of service request to an application manager;
   translating the dynamic quality of service request at the application manager to Packet Cable MultiMedia (PCMM);
   sending the translated dynamic quality of service request to a policy manager; and
   validating the translated dynamic quality of service request at the policy manager and determining resources needed to implement the dynamic quality of service request.

3. The method of claim 1, wherein the provisioning the session between the client and the third party server implementing the requested dynamic quality of service further comprises:
   routing a Packet Cable MultiMedia (PCMM) gate set to a cable modem termination system;
   determining resource availability at the cable modem termination system;
   creating a Packet Cable MultiMedia (PCMM) gate for the session; and
   communicating with the cable modem to set up a communication path between the third party server and the client and establishing a service flow with the requested dynamic quality of service for the session using the communication path.

4. The method of claim 1 further comprises:
   determining completion of the session;
   tearing down a communication path and the established service flow between the third party server and the client; and
   resetting the client to a standard rate cap.

5. The method of claim 4, wherein the tearing down the communication path and the established service flow further comprises:
   sending a signal from a policy manager to an edge proxy server for the edge proxy server to shut down the connection; and
   sending a notification of completion of the session to the third party server.

6. The method of claim 4, wherein the determining completion of the session comprises receiving a close session notification from the third party.

7. The method of claim 4, wherein the determining completion of the session comprises determining a predetermined period of time allotted to the session has elapsed.

8. The method of claim 4, wherein the determining completion of the session comprises determining a number of allowed bytes for the session has been met.

9. The method of claim 1, wherein the issuing the request to the third party server further comprises:
   issuing the request from the client to a cable modem;
   sending the request from the cable modem to a cable modem termination system; and
   routing the request from the cable modem termination system to the third party server.

10. The method of claim 1, wherein the receiving the dynamic quality of service request from the third party server further comprises receiving the dynamic quality of service request according to a first protocol and transforming the dynamic quality of service request according to the first protocol to a second protocol within Packet Cable MultiMedia (PCMM).

11. A system for securely provisioning Dynamic Quality of Service (DQOS) with an external third party, comprising:
   hosting content externally on a third party server of the external third party;

a cable modem termination system configured to route a request for content to the third party server;

an edge proxy server configured to receive a dynamic quality of service request from the third party server in response to issuance of the request to the third party server by the cable modem termination system and to validate the dynamic quality of service request; and in response to receiving and validating the dynamic quality of service request from the third party server, a policy manager communicating with the cable modem termination system to provision a session with the third party server implementing the requested dynamic quality of service, the policy manager determines if a subscriber needs more bandwidth than currently available and moves the subscriber to a different flow to provide more capacity to the subscriber, and implements the requested dynamic quality of service wherein the external third party manipulates a customer's token bucket by overriding the rate cap assigned to the customer for receiving content internally over an internal network of the subscriber and dynamically enlarging the token bucket or an aperture hole of the token bucket assigned to the customer thereby allowing the subscriber to experience an increased bandwidth over the internal network while receiving content from the external third party over the internal network.

12. The system of claim 11, wherein the edge proxy server generates a validated dynamic quality of service request.

13. The system of claim 12 further comprising an application manager for receiving the validated dynamic quality of service request and translating the dynamic quality of service request to Packet Cable MultiMedia (PCMM).

14. The system of claim 13, wherein the edge proxy server receives the translated dynamic quality of service request, validates the translated dynamic quality of service request, determines resources needed to implement the dynamic quality of service request, and routes a Packet Cable MultiMedia (PCMM) gate set to the cable modem termination system for establishing a communication path between the third party server and a client and establishing a service flow with the requested dynamic quality of service for the session using the communication path.

15. The system of claim 11, wherein the policy manager determines completion of the session, tears down a communication path and the established service flow between the third party server and a client and resets the client to a standard rate cap.

16. The system of claim 15, wherein the policy manager determines completion of the session based on receiving a close session notification from the third party.

17. The system of claim 15, wherein the policy manager determines completion of the session based on determining a predetermined period of time allotted to the session has elapsed.

18. The system of claim 15, wherein the policy manager determines completion of the session based on determining a number of allowed bytes for the session has been met.

19. The system of claim 11, wherein an application manager is disposed between the policy manager and the edge proxy server, the application manager receiving the dynamic quality of service request according to a first protocol from the edge proxy server and transforms the dynamic quality of service request according to the first protocol to a second protocol for use within Packet Cable MultiMedia (PCMM).

20. A computer-readable memory having stored thereon computer-executable instructions for securely provisioning Dynamic Quality of Service (DQOS) with an external third party, the computer-executable instructions, when executed by a computer, cause the computer to:

issue, for a subscriber of an internal network, a request to a third party server that is external to the internal network of the subscriber and hosting content of the external third party;

in response to issuing the request to the third party server, receive a dynamic quality of service request from the third party server;

validate the dynamic quality of service request from the third party server at an edge proxy server; and in response to receiving and validating the dynamic quality of service request from the third party server:

determine resources needed to implement the dynamic quality of service request;

determine if the subscriber needs more bandwidth than currently available and moving the subscriber to a different flow to provide more capacity to the subscriber; and provision a session between a client and the third party server implementing the requested dynamic quality of service wherein the external third party manipulates a customer's token bucket by overriding the rate cap assigned to the customer for receiving content internally over the internal network by preloading the customer's token bucket to capacity and dynamically enlarging the token bucket or an aperture hole of the token bucket, thereby allowing the subscriber to experience an increased bandwidth until the token bucket is exhausted over the internal network while receiving content from the external third party over the internal network.

21. The computer-readable memory of claim 20, wherein the validating the dynamic quality of service request comprises:

validate the dynamic quality of service request at an edge proxy server;

upon validation by the edge proxy server, send the dynamic quality of service request to an application manager;

translate the dynamic quality of service request at the application manager to Packet Cable MultiMedia (PCMM);

send the translated dynamic quality of service request to a policy manager; and validate the translated dynamic quality of service request at the policy manager and determining resources needed to implement the dynamic quality of service request.

22. The computer-readable memory of claim 20 further comprises:

determine completion of the session;

tear down a communication path and the established service flow between the third party server and the client; and reset the client to a standard rate cap.

* * * * *